3,403,201
METHOD FOR THE PREPARATION OF
O,O - DIMETHYL - S - (1,2 - DICARBETH-
OXYETHYL)DITHIOPHOSPHATE
Velniceriu Adrian, Tiliucă Romulus and Mihaiu Traian,
Bucharest, Rumania, assignors to Ministerul Industriei
Chimice, Bucharest, Rumania
No Drawing. Filed Dec. 8, 1964, Ser. No. 416,928
1 Claim. (Cl. 260—981)

ABSTRACT OF THE DISCLOSURE

A one-step process for preparation of O,O-dimethyl-S-(1,2-dicarbethoxyethyl)diethiophosphate by reaction of diethyl maleic ester with phosphorus pentasulfide in an organic solvent reaction medium.

---

The present invention relates to a one-step process for the preparation of the insecticide O,O-dimethyl-S-(1,2-dicarboethoxyethyl)dithiophosphate by condensation of diethyl maleic ester with phosphorus pentasulfide in an organic solvent medium.

The preparation of O,O-dimethyl-S-(1,2-dicarboethoxyethyl)dithiophosphate is carried out either in a one-step process by mixing and simultaneously reacting diethyl maleic ester with phosphorus pentasulfide and methanol, or in a two-step process by first mixing methanol and diethyl maleic ester and then adding phosphorus pentasulfide to the mixture. The process may be carried out in the absence of a reaction medium or in the presence of various alcohols, ketones, aliphatic esters, dimethoxyethane, dioxane, benzene, toluene, xylene, nitrobenzene, chlorobenzene, chloroform, carbon tetrachloride, and trialkyl phosphates as reaction medium. Catalysts may be added to the reaction medium, e.g. triethylamine, triisopropylamine, tri-n-butylamine or tri-2-ethylhexylamine as well as anti-polymerization agents. After completion of the reaction, the resulting solution is washed with a sodium carbonate solution and then with water.

The disadvantages of this method result from the violence of the condensation reaction between the pentasulfide suspended in diethylmaleic ester and methyl alcohol, which produces great evolution of heat. This accelerates the reaction and may even cause an explosion. After the condensation and washing steps are completed, the separation of the oily layer from the aqueous layer is also quite difficult to carry out, because of the small difference in densities.

The present invention eliminates the disadvantages of the known methods. In the one-step process for the preparation of O,O-dimethyl-S-(1,2-dicarbethoxy)dithiophosphate, a petroleum fraction is used as the reaction medium. This petroleum fraction has a boiling point of 60–115° C., $d_{20}=0.725$–$0.740$ and an aromatic content of at least 5%. The washing of the final reaction mixture is carried out with a saturated sodium chloride solution and the reaction mixture is neutralized with an aqueous solution of sodium carbonate and sodium chloride.

An example is given hereinbelow showing utilization of the method in accordance with the invention.

Seven hundred grams of a petroleum cut are introduced into a 4-neck flask, which is provided with a stirrer, reflux condenser, thermometer, and dropping funnel. The initial boiling point of the cut is 60–80° C. and the final boiling point is 100–115° C., $d_{20}=0.740$, and the aromatics content is 8% (as calculated from the aniline test). Forty grams of phosphorus pentasulfide (technical grade) are added with stirring.

The contents of the flask are heated to 65° C. with stirring and a mixture of 250 g. methanol and 450 g. diethylmaleic ester is added dropwise within a period of two hours, the stirring being continued and a constant temperature maintained. The temperature is maintained at 65° C. by controlling the droplets.

After the introduction of methanol and diethylmaleic ester is completed the temperature is raised to 70° C. and maintained for three hours. Twenty grams of diatomaceous earth or 20 g. activated charcoal are added with stirring, and the stirring is continued for one hour at 70° C.

The reaction mixture is then cooled to 35° C. and filtered under low pressure on a funnel with a porous plate of the $G_4$ type granulation. The filtrate is transferred to a separatory funnel and 1000 ml. of a saturated solution of sodium chloride (350 g./l. water) are added with vigorous stirring for two minutes. The two layers are allowed to separate and the aqueous layer removed.

A mixture of 500 ml. 10% aqueous sodium carbonate solution and 1000 ml. saturated sodium chloride solution, which has been previously filtered, is then added to the extract. Agitation is achieved by turning the funnel, the stopcock being kept open to avoid pressure build-up from the $CO_2$ evolved in the neutralization reaction. The agitation is not vigorous because the $CO_2$ evolved produces foaming of the mixture. After washing is completed, the two layers are allowed to separate and the aqueous layer is removed. The washing is finished when the pH of the solvent layer is a minimum of 5. If a dark colored precipitate appears at the interface of the two layers, thus preventing distinct layer separation, the precipitate should be retained in the funnel together with the organic layer. The third washing is carried out by adding 500 ml. saturated sodium chloride solution to the extract and stirring for about two minutes. The layers are allowed to separate and the aqueous layer removed from the organic one.

The pH of the solution after the third washing should be 5–6. If the pH is higher, washing is repeated until the pH is 5–6 using the quantity of saturated sodium chloride solution. After the final washing, any possible dark colored precipitate at the interface should be included in the aqueous layer.

After storage for 24 hours to separate any possible water layer, 1350 g. solution are obtained with $d_{20}=0.930$ and a minimum content of 50% O,O-dimethyl-S-(1,2-dicarbethoxyethyl)dithiophosphate, as determined colorimetrically.

This solution may be used to prepare emulsifying concentrates by adding emulsifying agents, or to prepare cold aerosols.

Practicing the process of this invention leads to the following advantages.

(1) The danger of the acceleration of the reaction is eliminated, because of the formation of the corresponding azeotropes, which immediately become vapors.

(2) The hydrogen sulfide is more easily eliminated from the reaction mass because of its higher solubility in aromatic hydrocarbons.

(3) The separation of the layers is accelerated by using saturated sodium chloride solution alone and admixed with sodium carbonate for washing.

What is claimed is:
1. In a process for the preparation of O,O-dimethyl-S-(1,2-dicarbethoxyethyl)dithiophosphate, the improvement which comprises the steps of carrying out the reaction of diethyl maleic ester with phosphorus pentasulfide and methanol in a petroleum fraction having 5% minimum aromatic content, a boiling of 60–115° C., and $d_{20}=0.725$–$0.740$, washing the reaction mixture with saturated aqueous sodium chloride solution, and neutralizing the reaction mixture with an aqueous solution of 10% sodium carbonate and saturated sodium chloride.

References Cited

UNITED STATES PATENTS 2,863,902  12/1958  Santay _____ 260—981

CHARLES B. PARKER, *Primary Examiner.*

A. H. SUTTO, *Assistant Examiner.*